US012427777B2

(12) United States Patent
Hayasaka et al.

(10) Patent No.: US 12,427,777 B2
(45) Date of Patent: Sep. 30, 2025

(54) LIQUID STORAGE CONTAINER

(71) Applicant: CANON KABUSHIKI KAISHA, Tokyo (JP)

(72) Inventors: Takashi Hayasaka, Kanagawa (JP); Keisuke Iinuma, Kanagawa (JP); Tatsuo Nanjo, Kanagawa (JP); Wataru Takahashi, Kanagawa (JP); Hiromasa Tsutsumi, Kanagawa (JP); Hideaki Matsumura, Tokyo (JP); Yusuke Naratani, Tokyo (JP); Tsuyoshi Saeki, Kanagawa (JP); Taiji Maruyama, Kanagawa (JP); Shota Asada, Tokyo (JP); Norio Sakurai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 134 days.

(21) Appl. No.: 18/416,599

(22) Filed: Jan. 18, 2024

(65) Prior Publication Data

US 2024/0300245 A1 Sep. 12, 2024

(30) Foreign Application Priority Data

Mar. 8, 2023 (JP) ................................ 2023-035505

(51) Int. Cl.
*B41J 2/175* (2006.01)

(52) U.S. Cl.
CPC ....... *B41J 2/17523* (2013.01); *B41J 2/17553* (2013.01)

(58) Field of Classification Search
CPC .... B41J 2/175; B41J 2/17503; B41J 2/17506; B41J 2/17509; B41J 2/17513; B41J 2/1752; B41J 2/17523; B41J 2/17553; B41J 29/13
See application file for complete search history.

(56) References Cited

U.S. PATENT DOCUMENTS 8,322,835 B2 * 12/2012 Aoki .................... B41J 2/17553 347/85
2005/0036016 A1 2/2005 Watanabe et al. ....... B41J 2/175
(Continued)

FOREIGN PATENT DOCUMENTS

JP 2020-151896 9/2020

OTHER PUBLICATIONS

U.S. Appl. No. 18/399,551, filed Dec. 28, 2023.
U.S. Appl. No. 18/524,987, filed Nov. 30, 2023.
U.S. Appl. No. 18/628,695, filed Apr. 6, 2024.

*Primary Examiner* — Anh T Vo
(74) *Attorney, Agent, or Firm* — Venable LLP

(57) ABSTRACT

A liquid storage container including a positioning configuration contributing to downsizing is provided. The container capable of storing liquid therein includes a fitting portion including a communication port establishing communication between an inside and an outside, wherein a supply member supplying liquid is fitted and can supply the inside with liquid via the communication port; a first positioning portion positioning the supply member at one point; and a second positioning portion including a guide provided in the fitting portion and capable of guiding the supply member to a position where the supply member is fitted into the fitting portion when the supply member is fitted into the fitting portion while being positioned by the first positioning portion and a restriction portion restricting movement of the supply member using the first positioning portion as a rotation axis in the position where the supply member is fitted into the fitting portion.

20 Claims, 12 Drawing Sheets

(56) References Cited

U.S. PATENT DOCUMENTS

| | | | | |
|---|---|---|---|---|
| 2006/0007286 | A1 | 1/2006 | Ogawa et al. | B41J 2/175 |
| 2008/0049080 | A1 | 2/2008 | Hayashi et al. | B41J 2/175 |
| 2009/0179979 | A1 | 7/2009 | Nanjo et al. | B41J 2/175 |
| 2009/0290003 | A1 | 11/2009 | Udagawa et al. | B41J 2/175 |
| 2011/0096128 | A1 | 4/2011 | Ogura et al. | B41J 2/175 |
| 2012/0300003 | A1 | 11/2012 | Takada et al. | B41J 2/175 |
| 2013/0222488 | A1 | 8/2013 | Miyashita et al. | B41J 2/175 |
| 2013/0222491 | A1 | 8/2013 | Nanjo et al. | B41J 2/175 |
| 2015/0375512 | A1 | 12/2015 | Kondo et al. | B41J 2/175 |
| 2015/0375514 | A1 | 12/2015 | Koshikawa et al. | B41J 2/175 |
| 2016/0200113 | A1 | 7/2016 | Nanjo et al. | B41J 2/175 |
| 2016/0200114 | A1 | 7/2016 | Nanjo et al. | B41J 2/175 |
| 2016/0347071 | A1 | 12/2016 | Saeki et al. | B41J 2/175 |
| 2017/0120606 | A1 | 5/2017 | Koshikawa et al. | B41J 2/175 |
| 2017/0120608 | A1 | 5/2017 | Takaoka et al. | B41J 2/175 |
| 2017/0120609 | A1 | 5/2017 | Kimura et al. | B41J 2/175 |
| 2017/0120610 | A1* | 5/2017 | Fukui | B41J 2/17523 |
| 2017/0120612 | A1 | 5/2017 | Fukuchi et al. | B41J 2/175 |
| 2017/0120613 | A1 | 5/2017 | Ikebe et al. | B41J 2/175 |
| 2017/0326882 | A1 | 11/2017 | Okude et al. | B41J 2/175 |
| 2019/0009561 | A1 | 1/2019 | Mukoyama et al. | B41J 2/175 |
| 2019/0009562 | A1 | 1/2019 | Abe et al. | B41J 2/165 |
| 2019/0163091 | A1 | 5/2019 | Koshikawa et al. | G03G 15/08 |
| 2019/0168508 | A1 | 6/2019 | Kondo | B41J 2/14 |
| 2019/0299649 | A1 | 10/2019 | Shimoyama et al. | B41J 2/045 |
| 2019/0299650 | A1 | 10/2019 | Saeki et al. | B41J 2/18 |
| 2020/0079096 | A1 | 3/2020 | Iinuma et al. | B41J 2/175 |
| 2020/0108624 | A1 | 4/2020 | Takahashi et al. | B41J 2/175 |
| 2020/0298575 | A1* | 9/2020 | Iinuma | B41J 2/17553 |
| 2020/0316973 | A1 | 10/2020 | Toki et al. | B41J 29/38 |
| 2021/0300052 | A1 | 9/2021 | Takei et al. | B41J 2/175 |
| 2021/0300055 | A1 | 9/2021 | Koshikawa et al. | B41J 2/175 |
| 2021/0362506 | A1 | 11/2021 | Kishikawa et al. | B41J 2/175 |
| 2022/0009244 | A1 | 1/2022 | Matsumura et al. | B41J 2/175 |
| 2022/0016893 | A1 | 1/2022 | Nagai et al. | B41J 2/175 |
| 2022/0016894 | A1 | 1/2022 | Nagaoka et al. | B41J 2/175 |
| 2022/0032633 | A1 | 2/2022 | Shimada et al. | B41J 2/175 |
| 2022/0097388 | A1 | 3/2022 | Nanjo et al. | B41J 2/175 |
| 2022/0258487 | A1 | 8/2022 | Jonouchi et al. | B41J 2/175 |
| 2023/0135411 | A1 | 5/2023 | Koshikawa | B41J 2/175 |
| 2023/0139685 | A1 | 5/2023 | Koshikawa | B41J 2/175 |
| 2023/0302806 | A1 | 9/2023 | Noda et al. | B41J 2/175 |
| 2023/0405995 | A1 | 12/2023 | Shimada et al. | B41J 2/175 |

* cited by examiner

LIQUID STORAGE CONTAINER

BACKGROUND OF THE INVENTION

Field of the Invention

The present invention relates to a liquid storage container.

Description of the Related Art

As a system to supply a liquid ejection head with liquid in a liquid ejection apparatus equipped with the liquid ejection head that ejects liquid such as ink, there is known a tube supply system to supply liquid from a main tank connected to the liquid ejection head via a tube. Japanese Patent Laid-Open No. 2020-151896 discloses a technique in which a tube is connected via a joint to a plurality of supply ports provided in a liquid storage container that stores liquid in a liquid ejection head.

In Japanese Patent Laid-Open No. 2020-151896, since the joint includes a connection portion corresponding to a supply port, a plurality of dedicated positioning portions are provided to position the supply port of the liquid storage container and the connection portion of the joint in corresponding positions. As a result, in the technique disclosed in Japanese Patent Laid-Open No. 2020-151896, since the plurality of positioning portions are formed, it is difficult to downsize the liquid storage container.

SUMMARY OF THE INVENTION

The present invention is made in view of the above problem and provides a liquid storage container including a positioning configuration that contributes to downsizing.

In the first aspect of the present invention, there is provided a liquid storage container capable of storing liquid inside the liquid storage container including:

- a fitting portion comprising a communication port that establishes communication between an inside and an outside, wherein a supply member for supplying liquid is fitted and can supply the inside with liquid via the communication port;
- a first positioning portion configured to position the supply member at one point; and
- a second positioning portion comprising a guide provided in the fitting portion and capable of guiding the supply member to a position where the supply member is fitted into the fitting portion in a case where the supply member is fitted into the fitting portion while being positioned by the first positioning portion and a restriction portion configured to restrict movement of the supply member using the first positioning portion as a rotation axis in the position where the supply member is fitted into the fitting portion.

The present invention makes it possible to achieve downsizing while maintaining a positioning function.

Further features of the present invention will become apparent from the following description of exemplary embodiments with reference to the attached drawings.

DESCRIPTION OF THE EMBODIMENTS

Hereinafter, an example of an embodiment of a liquid storage container will be described with reference to the accompanying drawings. It should be noted that the following embodiments do not limit the present invention, and not all combinations of features described in the present embodiment are essential to a solution to the problem to be solved by the present invention. Further, the positions, shapes, and the like of constituent elements described in the embodiments are merely examples, and the present invention is not intended to be limited thereto.

First Embodiment

First, an example of a liquid storage container according to a first embodiment will be described with reference to FIGS. 1 to 9C. In the present embodiment, as an example, there is described a mode in which the liquid storage container is provided in a liquid ejection head mounted in a liquid ejection apparatus and stores liquid to be ejected from the liquid ejection head and in which liquid is supplied from a main tank provided in the liquid ejection apparatus via a tube. That is, the liquid storage container according to the present invention is not limited to one provided in the liquid ejection head. In the present embodiment, the liquid ejection apparatus is a printing apparatus that ejects liquid such as ink onto a print medium to perform printing.

Configuration of the Liquid Ejection Apparatus

Figure 1:
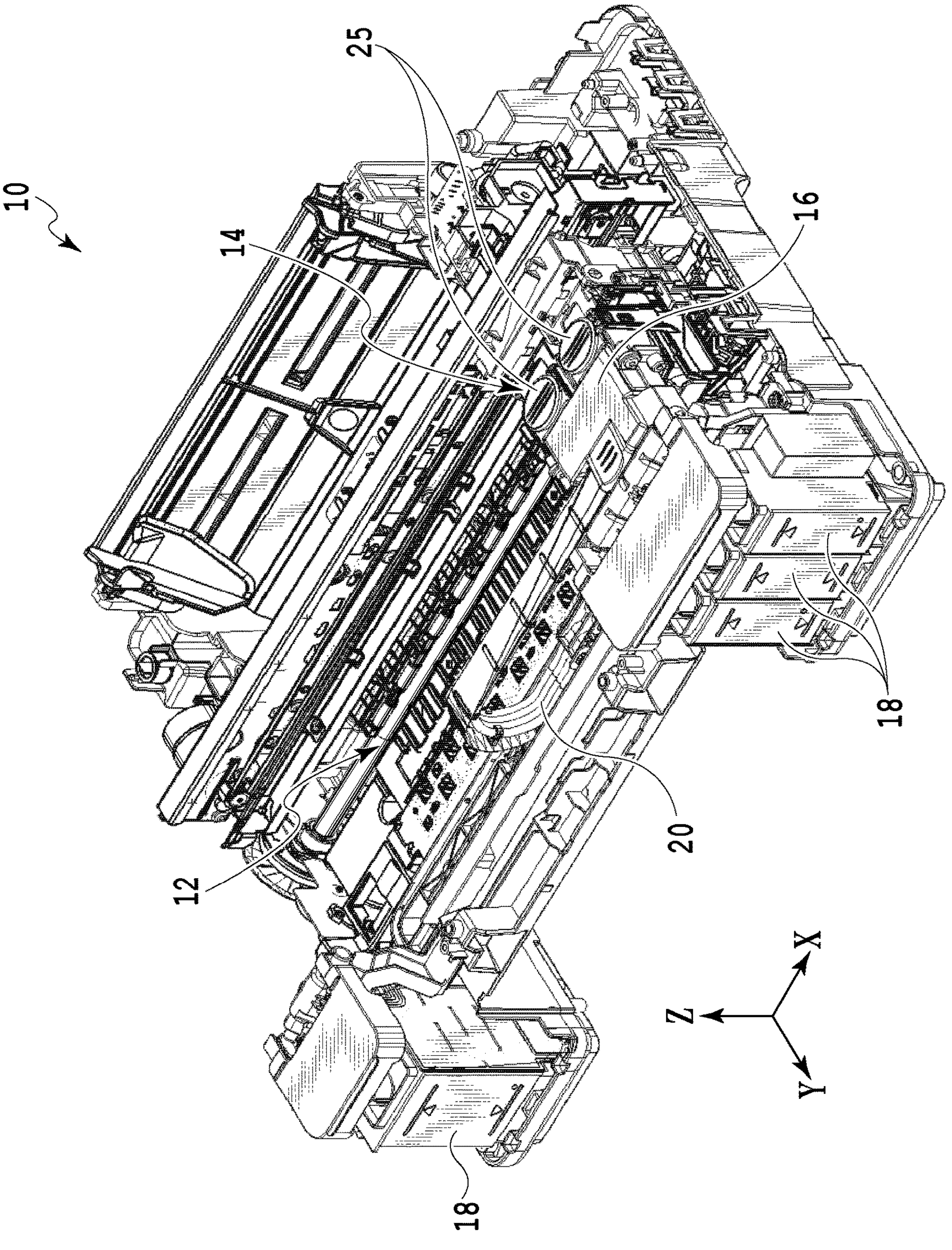
FIG. 1 is a schematic configuration diagram of a liquid ejection apparatus.

FIG. 1 is a schematic configuration diagram of the liquid ejection apparatus that ejects liquid from the liquid ejection head including the liquid storage container according to the present embodiment. An X direction, Y direction, and Z direction used in the present embodiment are directions orthogonal to each other and indicate directions in a case where the liquid ejection head is mounted in the liquid ejection apparatus, that is, at the time of using the liquid ejection apparatus. Further, each direction is expressed as a direction in a case where a main tank 18 is positioned in front: the X direction is a direction from a left side to a right side, the Y direction is a direction from a rear side (back side) to a front side (forward side), and the Z direction is a direction from a lower side to an upper side.

A liquid ejection apparatus 10 in FIG. 1 includes a conveyance portion 12 that conveys a print medium in the Y direction and a printing portion 14 that ejects liquid onto the print medium conveyed by the conveyance portion 12 to perform printing. The printing portion 14 includes a liquid ejection head 22 (see FIG. 2) that ejects liquid such as ink to perform printing and a carriage 16 equipped with the liquid ejection head 22 and configured to be reciprocally movable in the X direction. That is, the liquid ejection apparatus 10 is configured so that the liquid ejection head 22 is reciprocally movable in the X direction via the carriage 16. The overall operation of the liquid ejection apparatus 10 is controlled by a control portion (not shown).

The liquid ejection apparatus 10 also includes a main tank 18 for storing liquid and a tube 20 having one end connected to the main tank 18 and the other end connected to the liquid ejection head 22 mounted on the carriage 16. The tube 20 is formed of a flexible material so as to be able to follow the movement of the carriage 16 in the X direction.

The carriage 16 includes a joint 24 to which the tube 20 is connected (see FIG. 2) and a joint lever 25 for connecting the joint 24 to the mounted liquid ejection head 22. The joint 24 is moved downward by pressing down the joint lever 25 and is coupled to the liquid ejection head 22. By coupling the joint 24 and the liquid ejection head 22, the liquid ejection head 22 is properly mounted on the carriage 16. As described above, the liquid ejection head 22 communicates with the main tank 18 via the joint 24 and the tube 20 by being properly mounted on the carriage 16.

Figure 2:
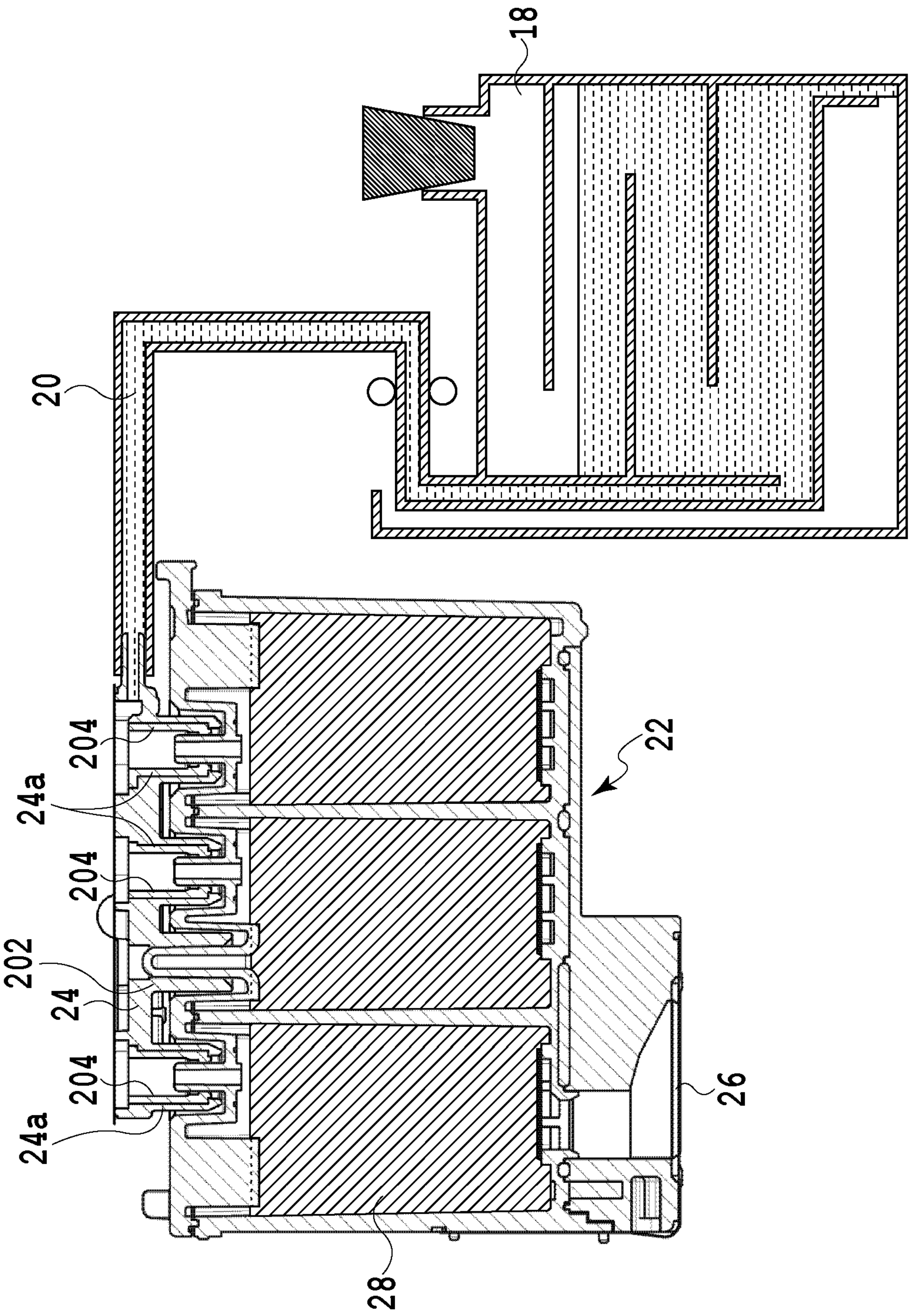
FIG. 2 is a diagram showing a system to supply ink to a liquid ejection head.

Configuration of the Liquid Ejection Head and a System to Supply Liquid to the Liquid Ejection Head Next, an overview of a configuration of the liquid ejection head 22 and a system to supply liquid to the liquid ejection head will be described. FIG. 2 is a diagram showing the system to supply liquid to the liquid ejection head.

Overview of the Configuration of the Liquid Ejection Head

The liquid ejection head 22 includes a print element substrate 26 as a liquid ejection portion that ejects liquid onto a print medium and a liquid storage container 28 as a liquid storage portion that stores liquid to be ejected from the print element substrate 26 (see FIG. 2). In the present embodiment, the print element substrate 26 and the liquid storage container 28 are integrally formed, and the printing element substrate 26 is arranged on the lower side of the liquid storage container 28 in the direction of gravity, that is, below the liquid storage container 28, with the liquid ejection head 22 mounted on the carriage 16. That is, it can be said that the liquid storage container 28 includes the print element substrate 26.

In the liquid ejection head 22, liquid stored in the liquid storage container 28 is supplied to the print element substrate 26. Further, in the printing element substrate 26, ejection energy is applied to liquid in accordance with a print signal output from the control portion. The liquid supplied to the print element substrate 26 is ejected from the print element substrate 26, that is, ejected from the liquid ejection head 22 by the ejection energy being applied to the liquid.

System to Supply Liquid to the Liquid Ejection Head

Liquid is ejected from the print element substrate 26, so that pressure inside the liquid storage container 28 becomes negative. As described above, the liquid ejection head 22 is connected to the main tank 18 via the joint 24 and the tube 20 (see FIG. 2). It should be noted that the main tank 18 has an interior where liquid is stored and which communicates with the atmosphere. As a result, in the liquid ejection head 22, as the negative pressure in the liquid storage container 28 increases due to liquid ejection from the print element substrate 26, liquid inside the main tank 18 is supplied accordingly through the tube 20 and the joint 24 to the liquid storage container 28. Further, air is introduced into the main tank 18. This air introduction maintains atmospheric pressure in the main tank 18. That is, the liquid ejection apparatus 10 is configured such that while printing is being performed on a print medium by ejecting liquid from the liquid ejection head 22, liquid in the main tank 18 is continuously supplied to the liquid storage container 28.

Configuration of the Liquid Storage Container

Figure 3A:
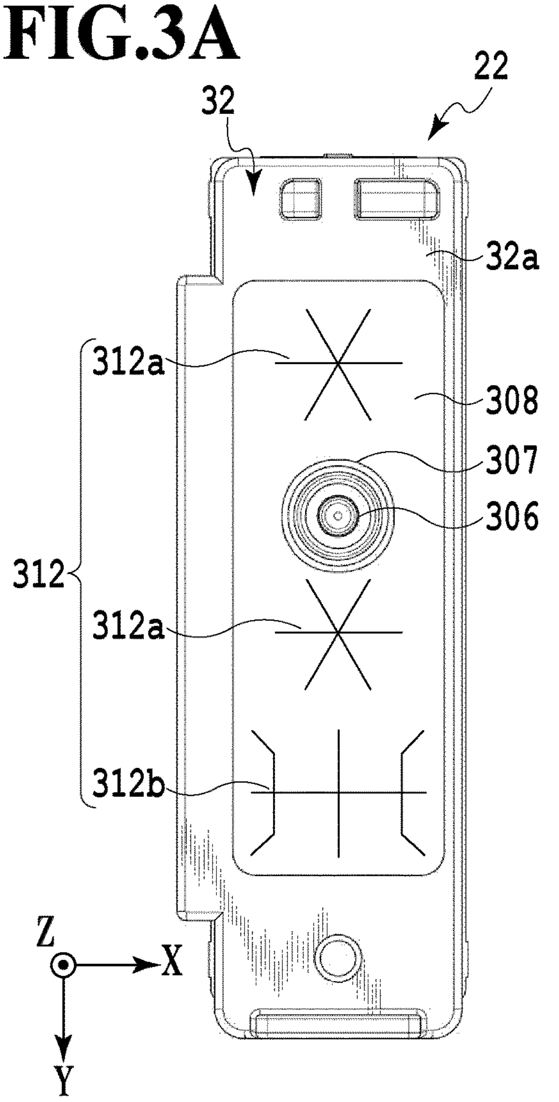
FIGS. 3A to 3C are configuration diagrams of a liquid storage container.
Figure 3B:
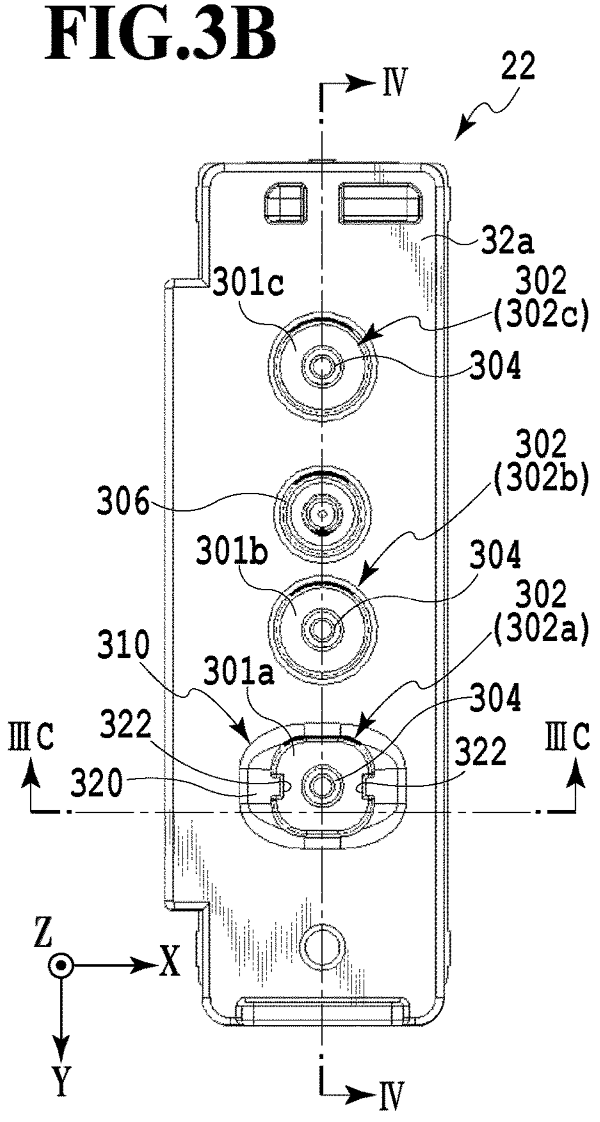
Figure 3C:
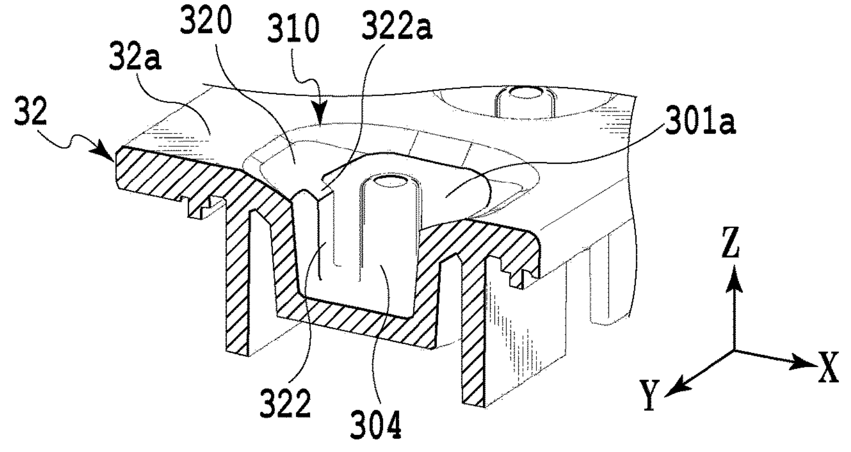
Figure 4:
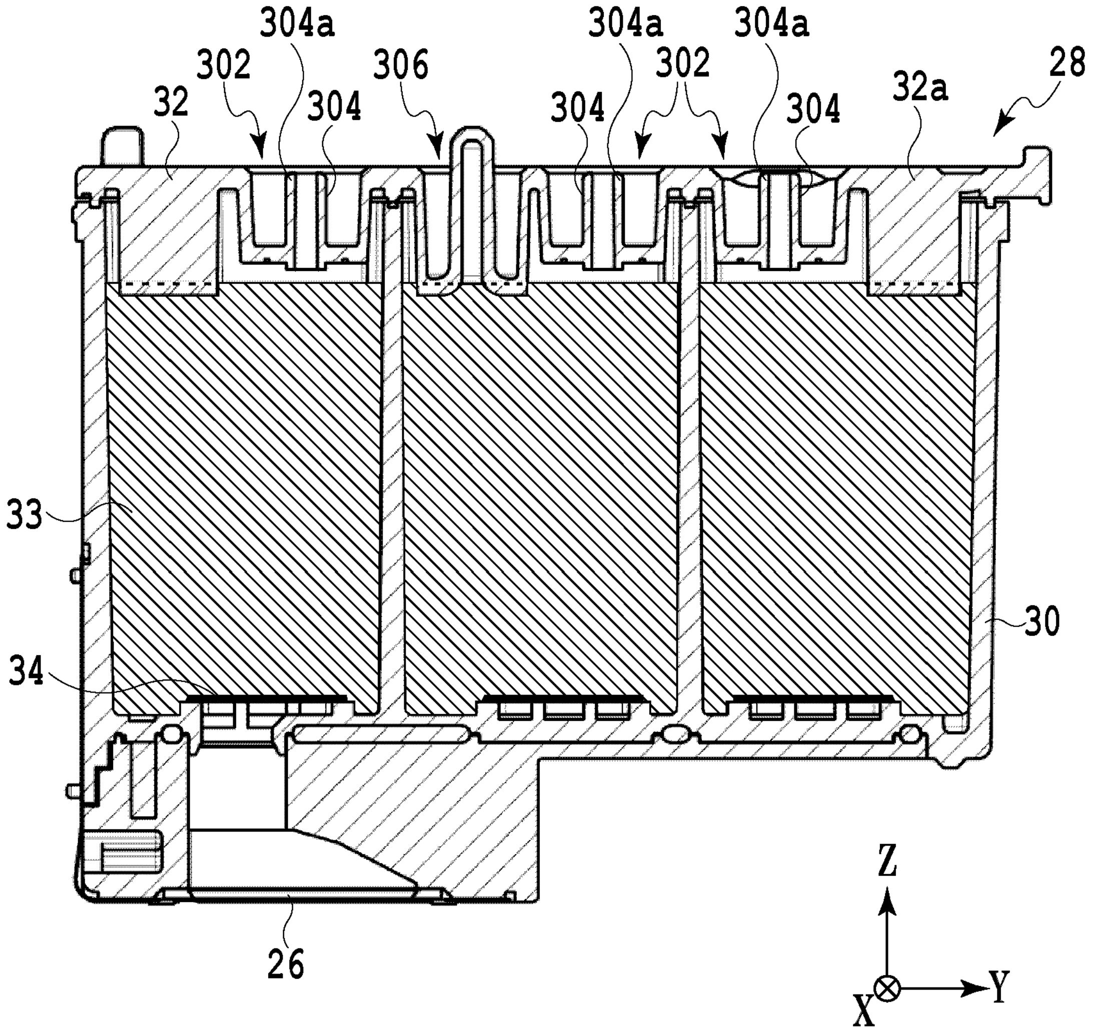
FIG. 4 is a cross-sectional view taken along line IV-IV in FIG. 3B.

Next, a configuration of the liquid storage container 28 will be described with reference to FIGS. 3A, 3B, 3C, and 4. FIGS. 3A to 3C are schematic configuration diagrams of the liquid storage container 28 in the liquid ejection head 22. FIG. 3A is a plan view of the liquid storage container 28, FIG. 3B is a plan view of the liquid storage container 28 from which the seal member is deleted, and FIG. 3C is a cross-sectional view of a lid member taken along line IIIc-IIIc in FIG. 3B. FIG. 4 is a cross-sectional view taken along line IV-IV in FIG. 3B.

The liquid storage container 28 includes a substantially box-shaped case member 30 with an open upper surface, and a lid member 32 that covers the opening on the upper surface of the case member 30 and is welded to the case member 30 (see FIG. 4). Liquid is stored in internal space of the case member 30 formed by the lid member 32 being welded to the case member 30. An absorber 33 made of a capillary member to absorb and hold liquid is provided inside the case member 30. Further, a filter 34 is provided inside the case member 30, and liquid stored in the case member 30 is supplied to the print element substrate 26 through the filter 34. That is, the filter 34 is provided to suppress foreign matter such as dust contained in the liquid stored inside the case member 30 from invading the print element substrate 26. As the absorber 33 provided inside the case member 30, for example, a fiber absorber is used.

The lid member 32 located on the upper surface of the liquid ejection head 22 in the case of being welded to the case member 30 is provided with a plurality of fitting portions 302 into which a connection portion 24*a* (see FIG. 2) through which liquid supplied to the joint 24 can flow out can be fitted so that the fitting portions 302 are exposed on an upper surface 32*a* of the lid member 32. In the present embodiment, three fitting portions 302 are formed along the Y direction (see FIG. 3B). It should be noted that the arrangement positions of the fitting portions 302 are not limited to this and can be modified as appropriate depending on the size of the liquid ejection head 22 and the like. Each fitting portion 302 includes a depressed portion (also referred to as "depression") 301*a* into which the connection portion 24*a* can be fitted. The fitting portion 302 also includes, at the center of the depressed portion 301*a*, a liquid supply port 304 inserted into the flow path 204 (see FIG. 2) provided in the connection portion 24*a* in a case where the connection portion 24*a* is fitted to guide liquid supplied through the flow path 204 into the case member 30. That is, the fitting portion 302 is configured to be able to supply liquid from the connection portion 24*a* to the inside of the case member 30 via the liquid supply port 304 in a case where the connection portion 24*a* is fitted. Although details will be described later, a guide portion 310 is formed in the fitting portion 302*a* provided at one end of the lid member 32 in the Y direction. Each fitting portion will be described herein as the fitting portion 302 unless otherwise specified.

In the lid member 32, a positioning portion 306 for positioning the connection portion 24*a* so that the connection portion 24*a* can be fitted into the corresponding fitting portion 302 in a case where the liquid storage container 28 is connected to the joint 24 is formed so as to be exposed on the upper surface 32*a*. Incidentally, this positioning portion 306 positions the joint 24 at one point in the lid member 32 by being fitted into a receiving member 202 (see FIG. 2) formed in the joint 24.

In the joint 24 provided in the carriage 16, the connection portion 24*a* including the flow path 204 through which liquid supplied to the joint 24 flows out is formed (see FIG. 2). The connection portion 24*a* has a substantially cylindrical shape that can be fitted into the fitting portion 302. The connection portion 24*a* is configured such that the liquid supply port 304 in the fitting portion 302 can be inserted into the flow path 204 from a lower end 24*aa* of the connection portion 24*a* (see FIG. 5B). The connection portion 24*a* and the fitting portion 302 are configured to be able to lead liquid flowing out from the tubular flow path 204 into the case member 30 without leaking the liquid in a case where the liquid supply port 304 is inserted into the flow path 204 with the connection portion 24*a* properly fitted into the fitting portion 302. In the present embodiment, the joint 24 and the connection portion 24*a* function as a supply member that supplies liquid to the liquid storage container 28.

The fitting portion 302 is provided with a liquid supply port (also referred to as "communication port") 304 at the center of the fitting portion 302, and the periphery of the liquid supply port 304 has a concave shape so as to accommodate the connection portion 24*a* to be fitted. It should be noted that an upper end 304*a* of the liquid supply port 304 is located a predetermined amount below the upper surface 32*a* of the lid member 32 in the Z direction (height direction) (see FIG. 4). That is, the liquid supply port 304 opens in the internal space of the fitting portion 302 without protruding from the upper surface 32*a* of the lid member 32.

The liquid ejection head 22 is shipped with liquid stored in the liquid storage container 28. Thus, on the liquid ejection head 22 shipped as a product, a seal member 308 is attached on the upper surface 32*a* of the lid member 32 so as to cover the fitting portion 302 including the liquid supply port 304 that communicates with the inside (see FIG. 3A). This suppresses leakage and evaporation of the liquid through the liquid supply port 304 caused by changes in environment, temperature, and the like before mounting the liquid ejection head 22 on the carriage 16.

It should be noted that the seal member 308 may be attached to the upper surface 32*a* so as to cover at least the fitting portion 302. However, it is preferable that an adhesion surface area adhered to the upper surface 32*a* be as large as possible in order to suppress peeling during distribution. Since the upper end 304*a* of the liquid supply port 304 is located below the upper surface 32*a*, a gap is provided between the upper end 304*a* and the seal member 308 attached to the upper surface 32*a*.

In the seal member 308, a notch portion 312 that can be broken by force from above is formed in a position corresponding to one of the fitting portions 302 in a case where the seal member 308 is attached to the upper surface 32*a*. More specifically, a notch portion 312*a* is formed in a position corresponding to the fitting portion 302 provided with no guide portion 310, and a notch portion 312*b* is formed in a position corresponding to the fitting portion 302*a* provided with the guide portion 310. A minute opening (not shown) is formed at the center of each of the notch portions 312*a* and 312*b* and functions as an atmosphere communication port that establishes communication between the inside of the liquid storage container 28 and the atmosphere. With such a configuration, pressure inside the liquid storage container 28 changing due to changes in ambient temperature and atmospheric pressure is adjusted. The notch portion 312 is formed of a notch formed on a surface 308*a* of the seal member 308, and the notch is formed without penetrating the seal member 308. Further, an opening 307 for exposing the positioning portion 306 to the outside in a case where the seal member 308 is attached to the upper surface 32*a* is formed in the seal member 308.

Problem Arising in a Known Technique

Figure 11A:
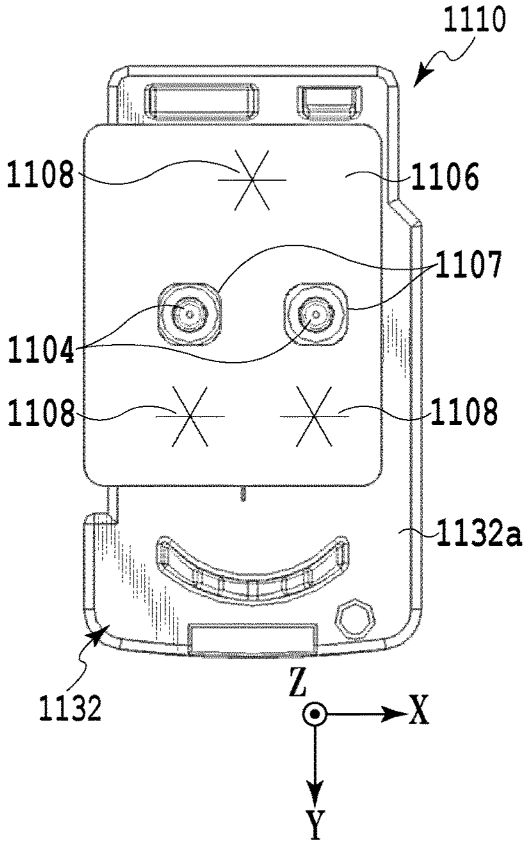
FIGS. 11A to 11C are schematic configuration diagrams of a liquid storage container of a known technique.
Figure 11B:
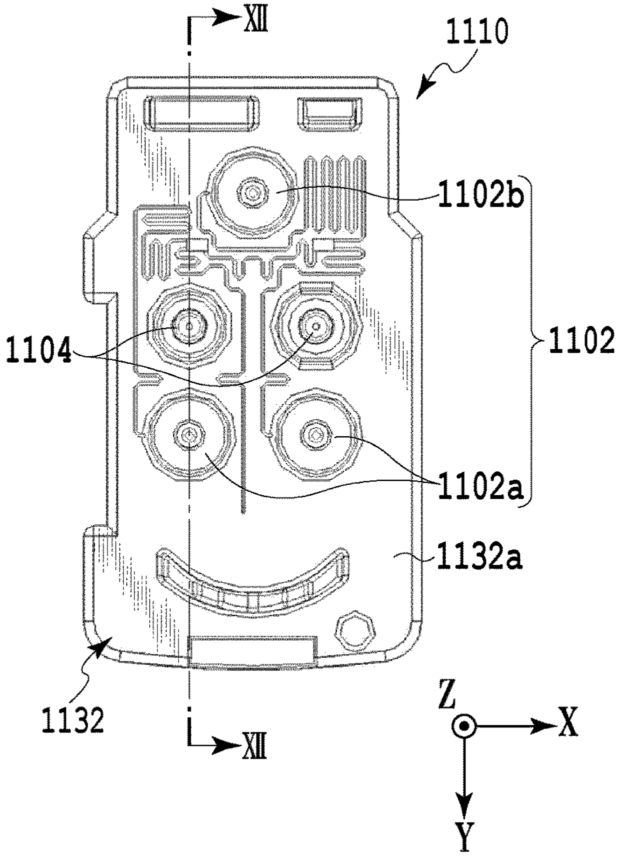
Figure 11C:
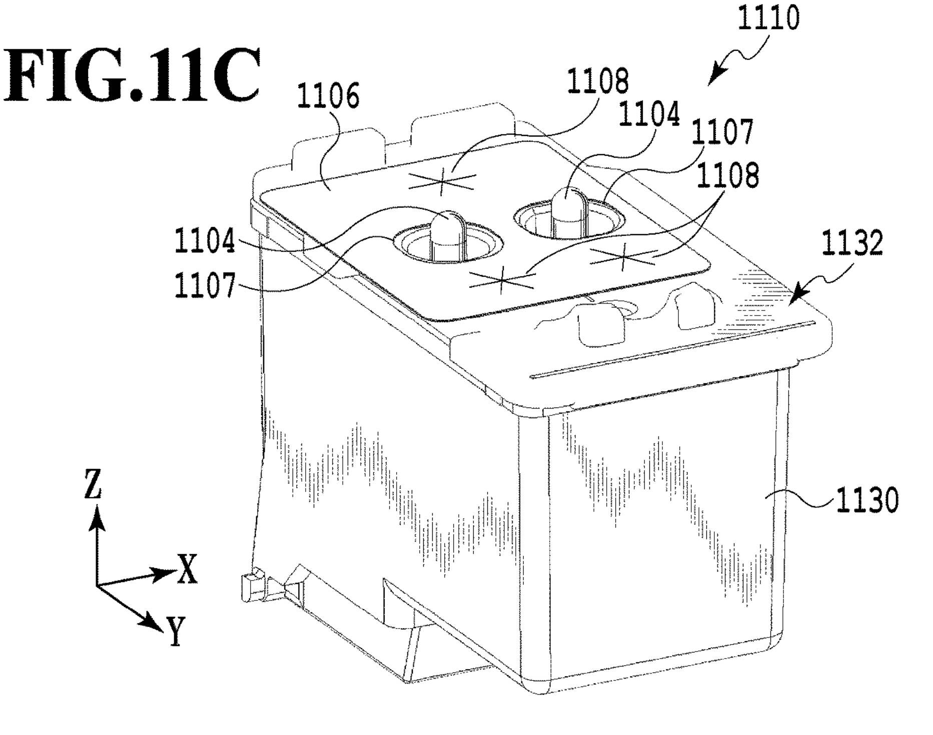

Here, a problem that arises in a known technique will be described. FIGS. 11A to 11C are schematic configuration diagrams of a liquid storage container according to the known technique. FIG. 11A is a plan view of the liquid storage container, FIG. 11B is a plan view of the liquid storage container from which a seal member is deleted, and FIG. 11C is a perspective view of the liquid storage container. FIGS. 12A to 12D are diagrams for explaining a process of connecting a joint to the liquid storage container according to the known technique. Incidentally, FIGS. 12A to 12D show a cross section taken along line XII-XII in FIG. 11B.

In a liquid storage container 1110 according to the known technique, two fitting portions 1102*a* are formed along the X direction on one end side in the Y direction, and one fitting portion 1102*b* is arranged on the other end side in the Y direction (see FIG. 11B). Two positioning portions 1104 are formed along the X direction between the fitting portion 1102*a* and the fitting portion 1102*b* in the Y direction. A seal member 1106 is attached to an upper surface 1132*a* of a lid portion 1132 (see FIGS. 11A and 11C). In the seal member 1106, a notch portion 1108 is formed in a position corresponding to the fitting portion 1102*a* or 1102*b* in a case where the seal member 1106 is attached to the upper surface 1132*a*. Further, an opening 1107 for exposing the positioning portions 1104 to the outside in a case where the seal member 1106 is attached to the upper surface 1132*a* is formed in the seal member 1106.

A joint 1124 (see FIGS. 12A to 12D) corresponding to the liquid storage container 1110 is positioned by the positioning portions 1104, and each connection portion 1124*a* in the joint 1124 presses and breaks the notch portion 1108 and is fitted into the corresponding fitting portion 1102. Specifically, first, the liquid storage container 1110 (a liquid ejection head including the liquid storage container 1110) is placed so that the upper surface 1132*a* is located in a position facing the joint 1124 in the carriage (see FIG. 12A).

Next, the joint lever 25 is operated to lower the joint 1124. In a case where the joint 1124 starts to descend, a receiving member 1126 abuts the positioning portion 1104, and the position of the joint 1124 with respect to the liquid storage container 1110 is restricted (see FIG. 12B). In a case where the joint 1124 further descends, each connection portion 1124*a* is then positioned by the positioning portion 1104 in a position corresponding to the corresponding fitting portion 1102 (see FIG. 12C). At this time, since two positioning portions 1104 are formed in the X direction in the liquid storage container 1110, the movement of the joint 1124 in an XY plane with respect to the liquid storage container 1110 is restricted. Thus, each connection portion 1124*a* is maintained in a position where it can be fitted into the corresponding fitting portion 1102 by being lowered.

Figure 12A:
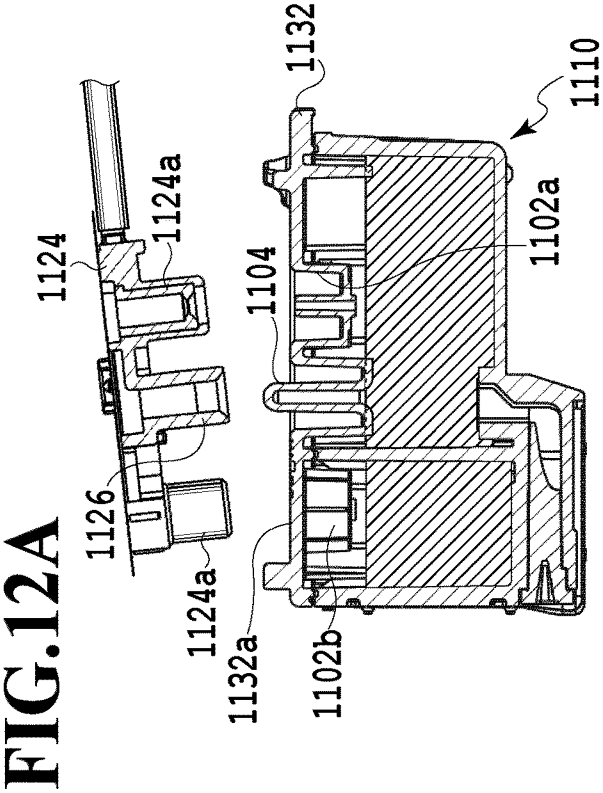
FIGS. 12A to 12D are diagrams for explaining the connection of a joint to the liquid storage container in FIG. 11A.
Figure 12B:
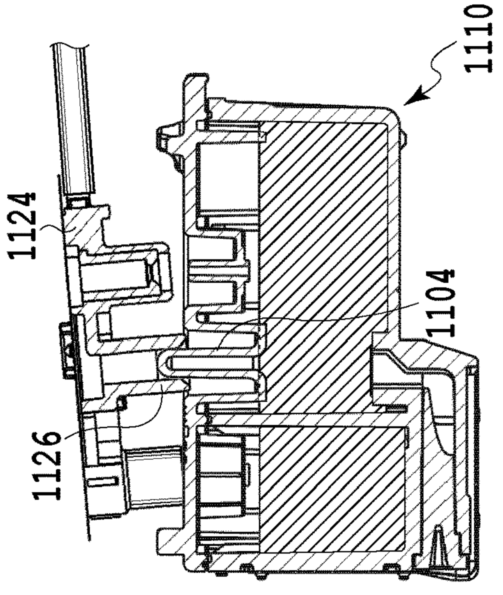
Figure 12C:
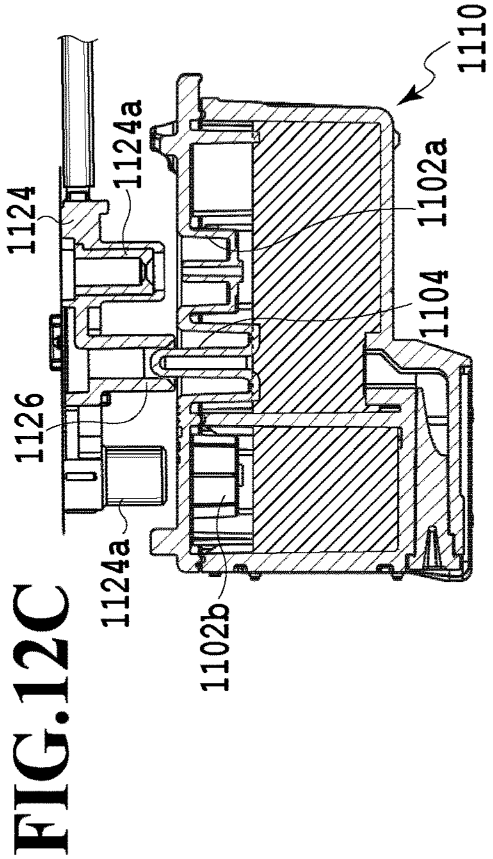
Figure 12D:
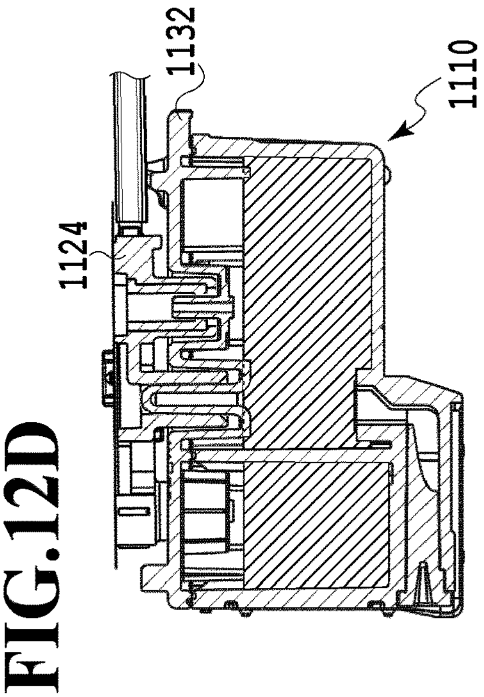

After that, the joint 1124 is further lowered, the notch portion 1108 is broken by the connection portion 1124*a*, and the connection portion 1124*a* is fitted into the fitting portion 1102 (see FIG. 12D). As described above, in the liquid storage container 1110 according to the known technique, in a case where the joint 1124 is connected, the two positioning portions 1104 arranged in parallel in the X direction suppress rotation in the XY plane and position the joint 1124 with respect to the liquid storage container 1110. Thus, in the known technique, there is a need for space for arranging at least two positioning portions in the lid member, which limits downsizing of the liquid storage container.

Positioning Configuration in the Liquid Storage Container

Thus, in the present embodiment, as a configuration for positioning the joint 24 with respect to the liquid storage container 28, one positioning portion is formed and a guide portion that guides a corresponding connection portion to a fitting position and restricts subsequent movement is formed in one of the fitting portions. The configuration for positioning the joint 24 with respect to the liquid storage container 28 will be described in detail below with reference to FIGS. 3A to 3C and 5A to 9C.

Positioning Configuration

In the present embodiment, three fitting portions 302 are arranged in parallel along the Y direction, and the positioning portion 306 is arranged between a second fitting portion 302*b* and a third fitting portion 302*c* from one end in the Y direction (the lower side in FIG. 3B). In the present embodiment, each fitting portion 302 and the positioning portion 306 are arranged so that their center positions are located on the same straight line. Thus, the connection portion 24*a* provided in a position corresponding to the fitting portion 302 and the receiving member 202 are also located on the same straight line in the joint 24. It should be noted that the position where the positioning portion 306 is formed is not limited to this and may be modified as appropriate depending on the size of the liquid ejection head 22, the arrangement position of the fitting portion 302, and the like.

Further, the guide portion 310 is provided in the fitting portion 302*a* provided on one end side in the Y direction. The guide portion 310 includes a substantially elliptical inclined portion 320 formed to surround the fitting portion 302*a* and extending in the X direction. The guide portion 310 also includes a restriction portion 322 that protrudes toward the liquid supply port 304 and extends in the Z direction in the depressed portion 301*a* of the fitting portion 302*a* (see FIGS. 3B and 3C). It should be noted that the depressed portion 301*a* of the fitting portion 302*a* is formed to have a larger opening than those of the depressed portions 301*b* and 301*c* of the fitting portions 302*b* and 302*c*, respectively as viewed from directly above (see FIG. 3B).

The inclined portion 320 is an inclined surface formed so as to be inclined downward toward the center of the fitting portion 302*a*. The inclined portion 320 has a substantially elliptical shape extending in the X direction and thus is formed to be wider in the X direction than in the Y direction. The size of the inclined portion 320 is modified as appropriate depending on, for example, the shape and size of the connection portion 24*a* in the joint 24. It should be noted that the inclination angle of the inclined portion 320 is, for example, an angle such that the liquid supply port 304 can be inserted into the flow path 204 of the connection portion 24*a* guided along the inclined portion 320. As describe above, in the present embodiment, the inclined portion 320 functions as a guide capable of guiding the connection portion 24*a* to a position where the connection portion 24*a* can be fitted into the fitting portion 302*a*.

The restriction portion 322 is formed so as to abut the outer peripheral surface of the connection portion 24*a* properly fitted into the fitting portion 302 with the liquid supply port 304 inserted into the flow path 204. At this time, in order to reduce the area of contact between the outer peripheral surface of the connection portion 24*a* and the restriction portion 322 and reduce sliding resistance at the time of insertion of the connection portion 24*a* into the fitting portion 302*a*, it is preferable that the restriction portion 322 be formed so as to sandwich the outer peripheral surface of the connection portion 24*a*. In the present embodiment, the restriction portions 322 are provided in two opposed positions with the liquid supply port 304 interposed therebetween. The distance between the restriction portions 322 provided oppositely has a length such that the corresponding connection portion 24*a* can be inserted and fitted between the restriction portions 322 and the movement of the fitted connection portion 24*a* can be restricted (for example, a length that substantially coincides with the outer diameter of the connection portion 24*a*). The restriction portion 322 restricts the movement of the connection portion 24*a* within the relatively large depressed portion 301*a* in a case where the connection portion 24*a* is fitted into the fitting portion 302*a*. For example, the upper surface 322*a* of the restriction portion 322 is formed so as to be inclined downward toward the center of the fitting portion 302*a*. This upper surface 322*a* is formed to be flush with the inclined portion 320. Alternatively, the upper surface 322*a* may be formed in a lower position than the inclined portion 320. As described above, in the present embodiment, the joint 24 is positioned with respect to the liquid storage container 28 using the positioning portion 306 (first positioning portion) and the guide portion 310 (second positioning portion).

It should be noted that in the above description, the restriction portion 322 is formed so as to abut the outer peripheral surface of the connection portion 24*a*, but the present invention is not limited to this. For example, the restriction portion 322 may be formed on the outer peripheral portion of the liquid supply port 304 so as to abut the inner peripheral surface of the connection portion 24*a*, that is, the flow path 204. Alternatively, the restriction portion 322 may be provided in the flow path 204 of the connection portion 24*a*. In these cases, there is a possibility that the restriction portion 322 may be caught in depending on an angle of insertion of the connection portion 24*a* into the fitting portion 302*a*. Thus, in this case, it is necessary to appropriately design the shapes of the inner peripheral surfaces of the liquid supply port 304 and the connection portion 24*a*.

Connection of the Joint to the Liquid Storage Container

Next, a description will be given of the connection of the joint 24 to the liquid storage container 28 having the above positioning configuration. FIGS. 5A to 5D are diagrams for explaining a process of connecting the joint to the liquid storage container 28 having the above positioning configuration. FIG. 6 is a diagram showing a state where an array line of the connection portions 24*a* in the joint 24 is deviated from an array line of the fitting portions 302.

The joint 24 corresponding to the liquid storage container 28 is positioned by the positioning portion 306 and the guide portion 310, and the connection portion 24*a* in the joint 24 presses and breaks the notch portion 312 and is fitted into the corresponding fitting portion 302. Specifically, first, the liquid storage container 28 (liquid ejection head 22) is placed so that the upper surface 32*a* is located in a position facing the joint 24 in the carriage 16 (see FIG. 5A).

Next, the joint lever 25 is operated to lower the joint 24. In a case where the joint 24 starts to descend, the receiving member 202 abuts the positioning portion 306, and the position of the joint 24 with respect to the liquid storage container 28 is restricted (see FIG. 5B). At this time, since the joint 24 is positioned at one point in the lid member 32 by the positioning portion 306, there is a possibility that a line in which the connection portions 24*a* in the joint 24 are arrayed is inclined from a line in which the three fitting portions 302 are arrayed around the positioning portion 306.

Figure 5A:
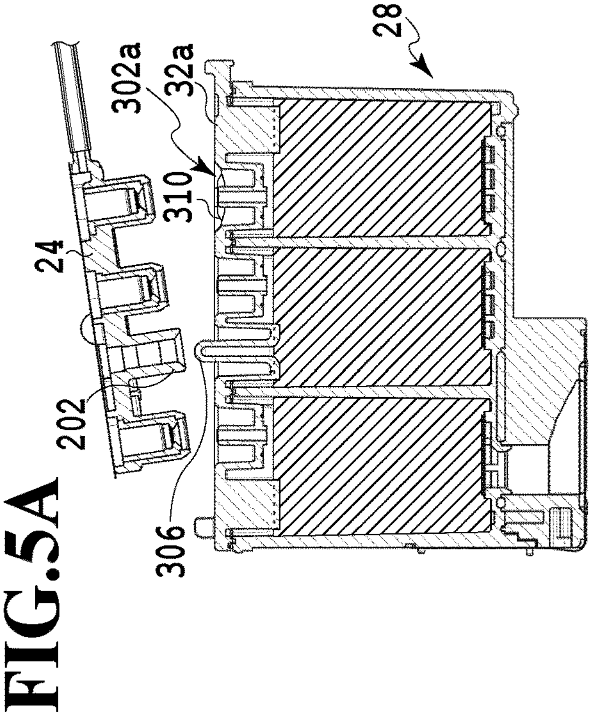
FIGS. 5A to 5D are diagrams for explaining the connection of a joint to the liquid storage container.
Figure 5B:
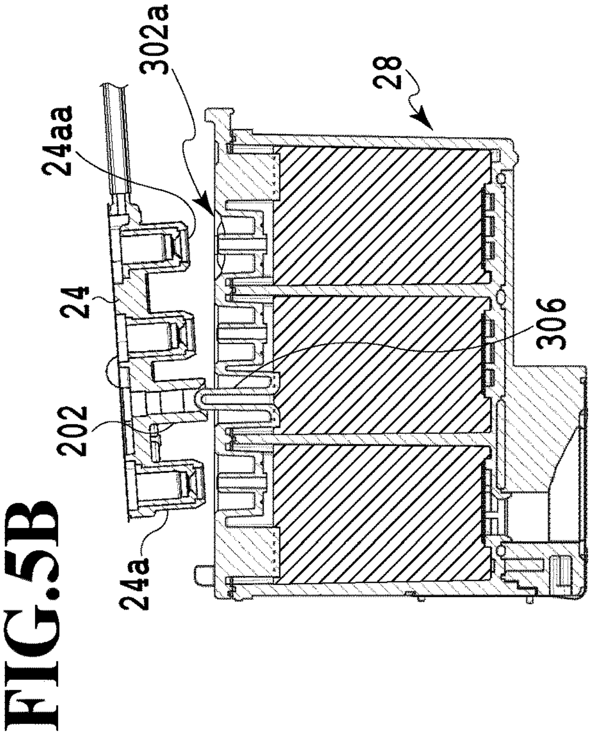
Figure 5C:
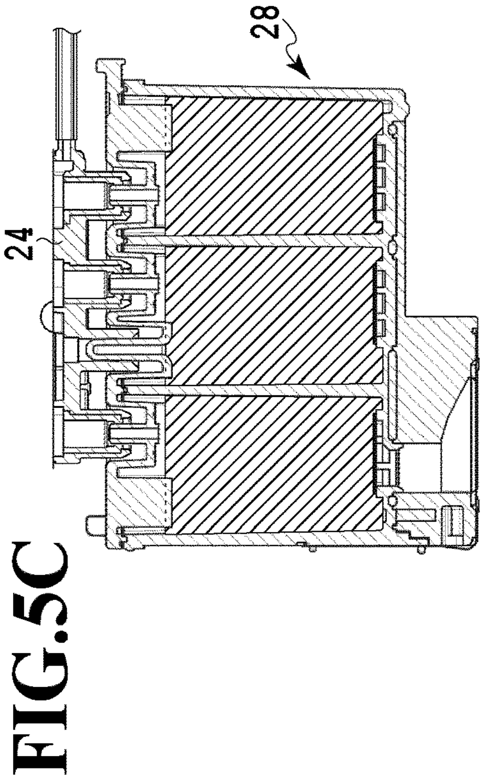
Figure 5D:
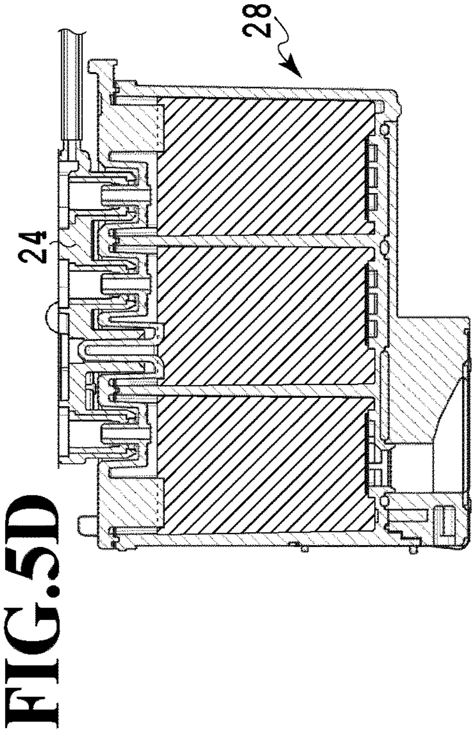
Figure 6:
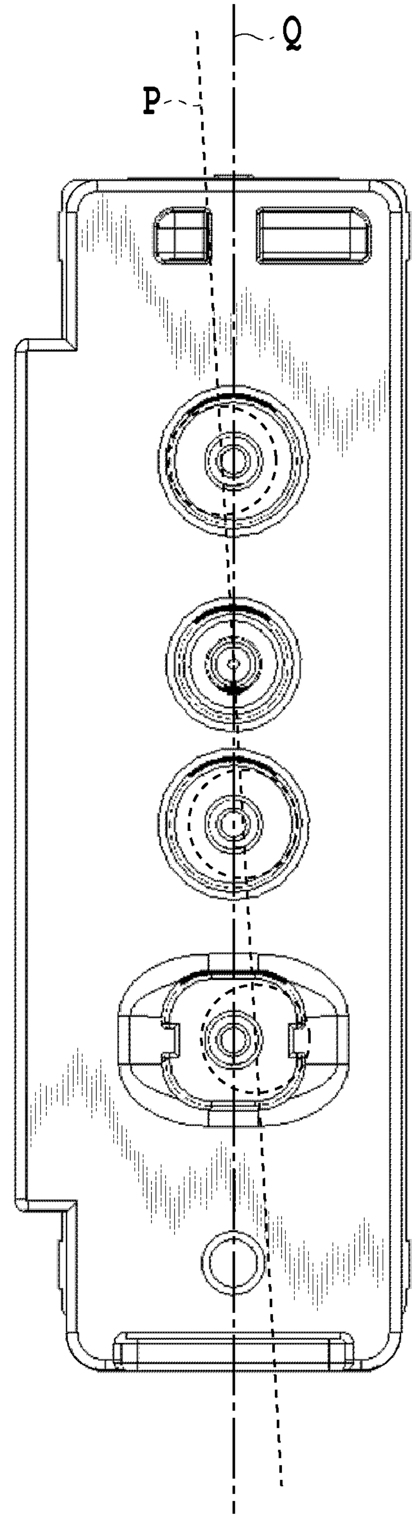
FIG. 6 is a diagram showing a misalignment between an array line of fitting portions and an array line of connection portions.

In a case where the joint 24 is further lowered from the state shown in FIG. 5B, in a case where the array line of the connection portions 24*a* overlaps the array line of the fitting portions 302, the connection portion 24*a* and the fitting portion 302 corresponding to each other are in positions such that the two can be fitted to each other. Thereafter, the joint 24 is further lowered, the notch portion 312 is broken by the connection portion 24*a* (see FIG. 5C), and the connection portion 24*a* is fitted into the fitting portion 302 (see FIG. 5D).

On the other hand, in a case where the joint 24 is further lowered from the state shown in FIG. 5B, in a case where the array line of the connection portions 24*a* (see a broken line P in FIG. 6) is inclined with respect to the array line of the fitting portions 302 (see an alternate long and short dashed line Q in FIG. 6), each connection portion 24*a* and the corresponding fitting portion 302 are not in positions such that the two can be fitted to each other (see FIG. 6). Thus, in a case where the notch portion 312 is broken by the connection portion 24*a* by lowering the joint 24, the connection portion 24*a* corresponding to the fitting portion 302*a* abuts the inclined portion 320 of the guide portion 310. After that, the joint 24 is further lowered, so that the connection portion 24*a* moves along the inclined portion 320 to a position where the connection portion 24*a* can be fitted into the fitting portion 302*a*. As a result, the joint 24 rotates around the positioning portion 306, the array line of the connection portions 24*a* and the array line of the fitting portions 302 overlap, and the connection portion 24*a* and the fitting portion 302 corresponding to each other are positioned in positions such that the two can be fitted to each other (see FIG. 5C). Thereafter, the joint 24 is further lowered, and the connection portion 24*a* is fitted into the fitting portion 302 (see FIG. 5D). At this time, the connection portion 24*a* is fitted into the fitting portion 302*a* with the outer peripheral surface of the connection portion 24*a* sandwiched between the restriction portions 322 located oppositely, so that the subsequent movement of the connection portion 24*a* is restricted. In the present embodiment, a direction in which the joint 24 rotates, that is, a movement direction in which the connection portion 24*a* moves is substantially an X direction, and a direction in which the inclined portion 320 extends approximately coincides with the movement direction.

As described above, in the present embodiment, the joint 24 is positioned with respect to the liquid storage container 28 by one of the positioning portions 306 and the guide portion 310 provided in the fitting portion 302. A length for which the guide portion 310 extends in the X direction is shorter than the length of two of the positioning portions 306 arranged side by side. Further, the length of the guide portion 310 in the Y direction is minute. Thus, the liquid storage container 28 of the present embodiment has less constraints on downsizing than the liquid storage container 1110, while achieving the same positioning accuracy as that of the liquid storage container 1110 with a plurality of positioning portions according to the known technique.

Configuration of the Notch Portion Corresponding to the Fitting Portion With the Guide Portion As described above, in the case of fitting the connection portion 24*a* into the fitting portion 302, the seal member 308 must be broken at the notch portion 312. In the fitting portion 302*a*, the restriction portion 322 is formed in the depressed portion 301*a* into which a fragment of the seal member 308 broken at the notch portion 312 is pushed. As a result, there is a possibility that the fragment may enter a gap between the restriction portion 322 and the outer peripheral surface of the connection portion 24*a* and that the connection portion 24*a* cannot be fitted into the fitting portion 302*a*. Thus, the fragment must not overlap the restriction portion 322 in a case where the seal member 308 is broken at the notch portion 312 by the connection portion 24*a*.

Figure 7A:
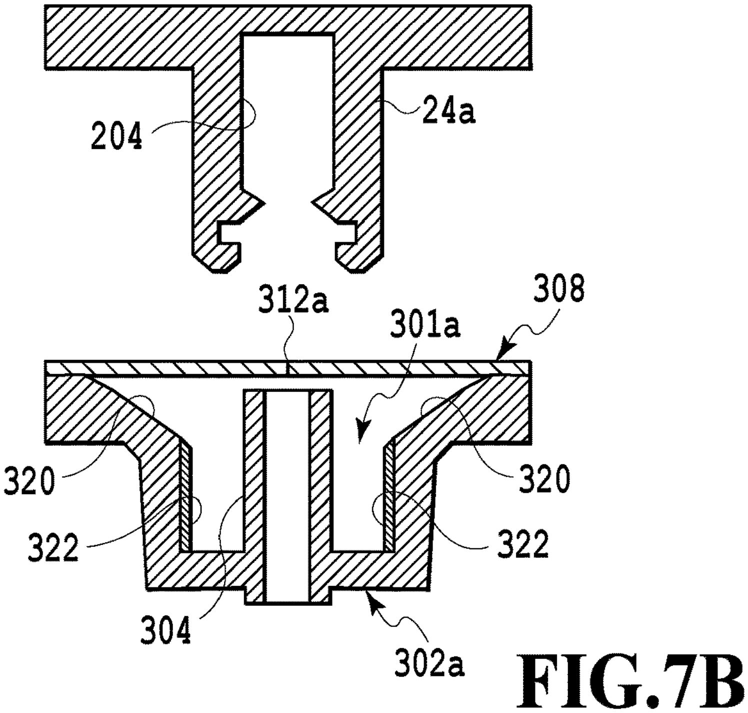
FIGS. 7A to 7C are diagrams showing the movement of a fragment of a seal member at the time of fitting of a connection portion into a fitting portion.
Figure 7B:
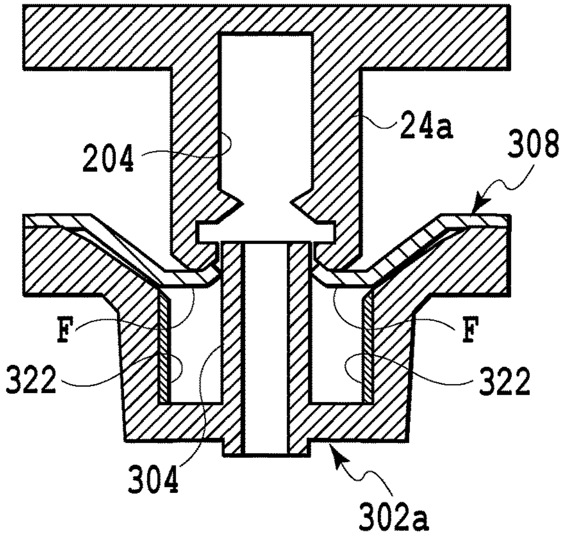
Figure 7C:
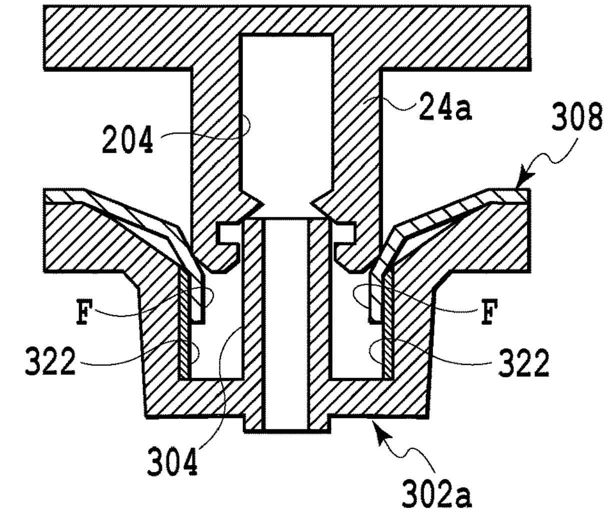

FIGS. 7A to 7C are diagrams showing the relationship between a fragment of the seal member 308 and the restriction portion 322 in a case where the seal member 308 is broken at the notch portion 312. In FIGS. 7A to 7C, a notch such as the notch portion 312*a* formed so that three linear notches overlap in a center position is formed in a position corresponding to the fitting portion 302*a*. FIGS. 7A to 7C are diagrams corresponding to cut cross-sections cut in positions corresponding to those in FIGS. 9A to 9C to be described later.

In a case where the positioned connection portion 24*a* is fitted into the fitting portion 302*a*, the seal member 308 is broken at the notch portion 312*a* (see FIGS. 7A and 7B). After that, by further lowering the connection portion 24*a*, the connection portion 24*a* is fitted into the fitting portion 302*a* while the liquid supply port 304 is inserted into the flow path 204. At this time, a fragment F of the seal member 308 broken at the notch portion 312*a* is pushed into the depressed portion 301*a* by the descending connection portion 24*a*. However, the restriction portion 322 is formed in the depressed portion 301*a* of the fitting portion 302*a*. Thus, in a case where the shape of a notch is like that of the notch portion 312*a*, there is a possibility that the fragment F may enter the gap between the restriction portion 322 and the outer peripheral surface of the connection portion 24*a* (see FIG. 7C). The restriction portions 322 are provided in positions facing each other at a distance substantially equal to the outer diameter of the connection portion 24*a* in order to restrict the movement of the fitted connection portion 24*a*. Thus, in a case where the fragment F enters the gap between the restriction portion 322 and the outer peripheral surface of the connection portion 24*a*, the connection portion 24*a* cannot be fitted into the fitting portion 302*a*. In a case where the connection portion 24*a* cannot be fitted into the fitting portion 302*a*, the connection portion 24*a* also cannot be fitted into another fitting portion 302*b* or 302*c*.

Thus, in the present embodiment, a notch of a notch portion is formed so that a fragment of the broken seal member 308 does not overlap the restriction portion 322 in a case where the connection portion 24*a* is fitted into the fitting portion 302*a*. Specifically, for example, the notch portion 312*b* is formed so that a portion of the notch passes over the restriction portion 322 and a fragment Fx (see FIG. 8B) located on the inclined portion 320 after a break has a length such that the fragment Fx does not overlap the inclined portion 320. The notch portion 312*b* formed in a position corresponding to the fitting portion 302 will be described in detail below with reference to FIGS. 8A to 9C.

Figure 8A:
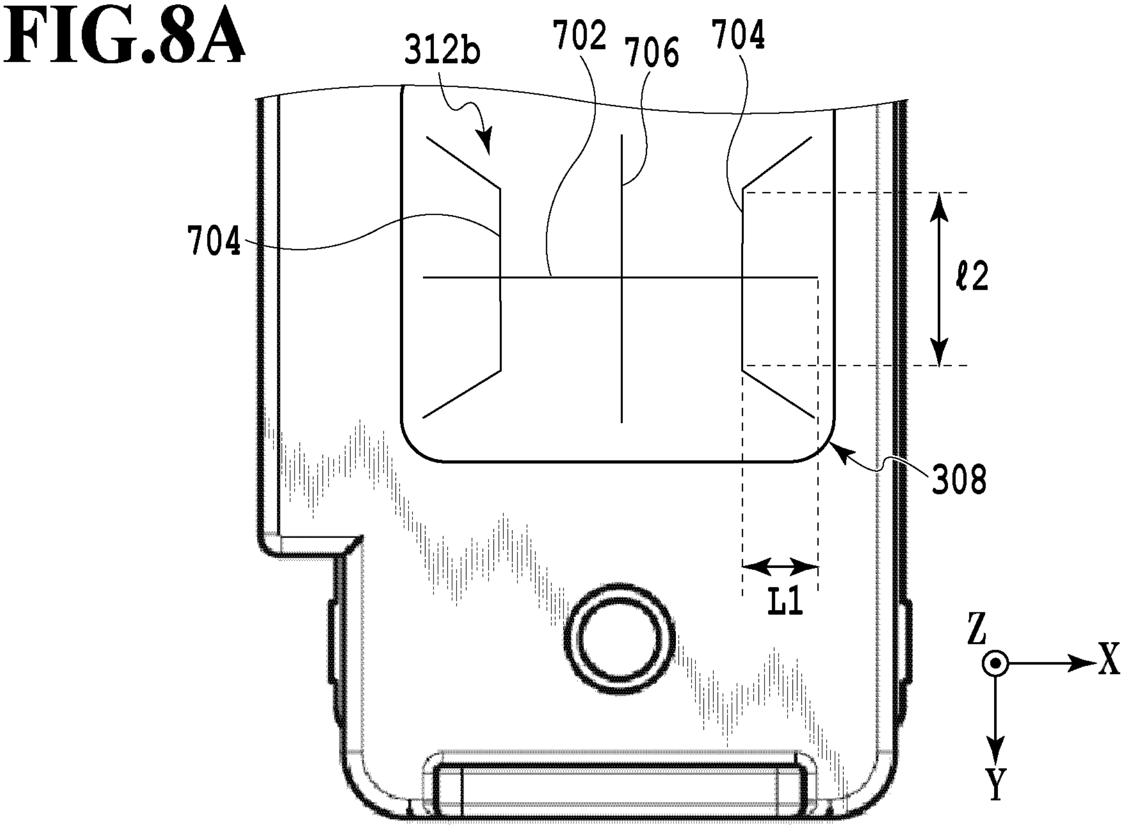
FIGS. 8A and 8B are diagrams for explaining a notch portion of the seal member.
Figure 8B:
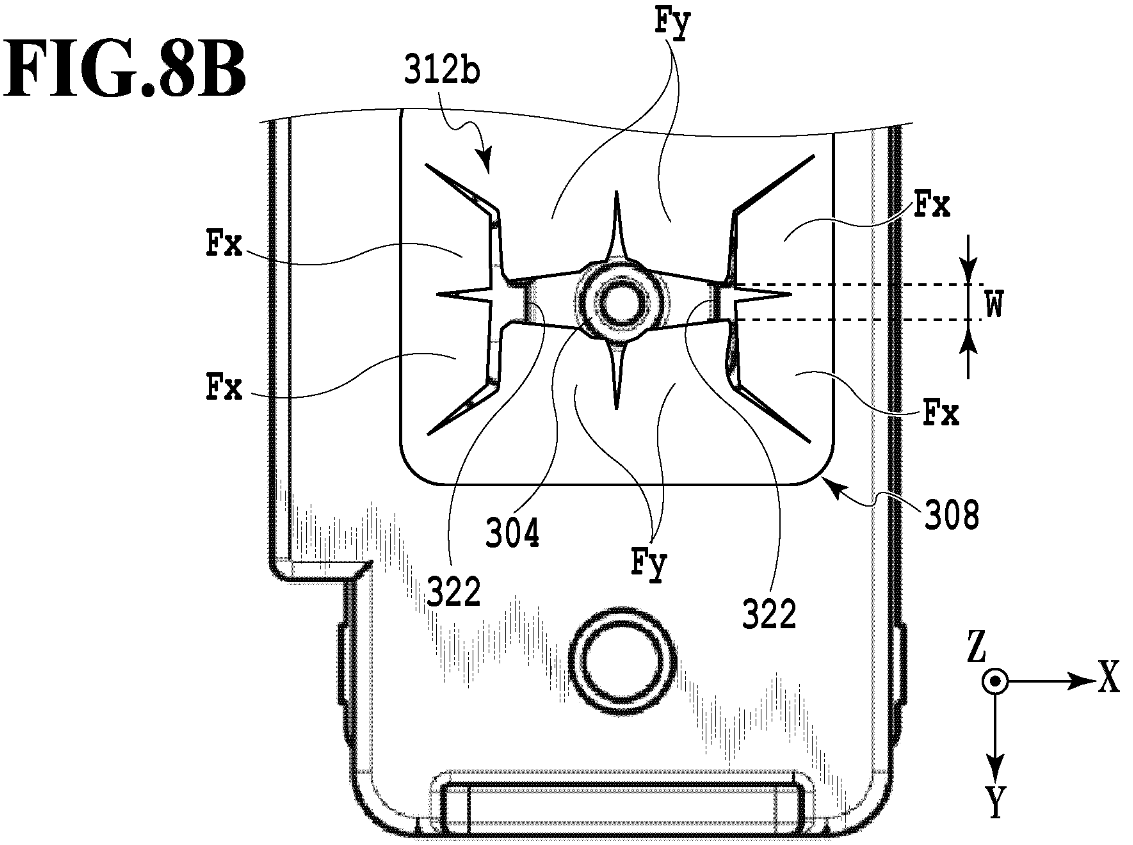
Figure 9A:
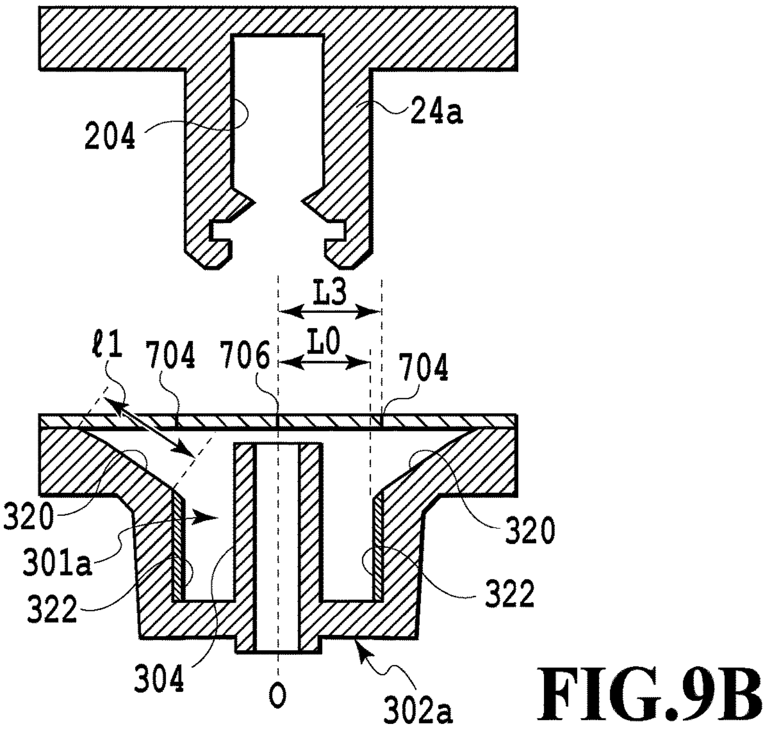
FIGS. 9A to 9C are diagrams showing the movement of a fragment of the seal member at the time of fitting in the case of providing the notch portion in FIG. 8A.
Figure 9B:
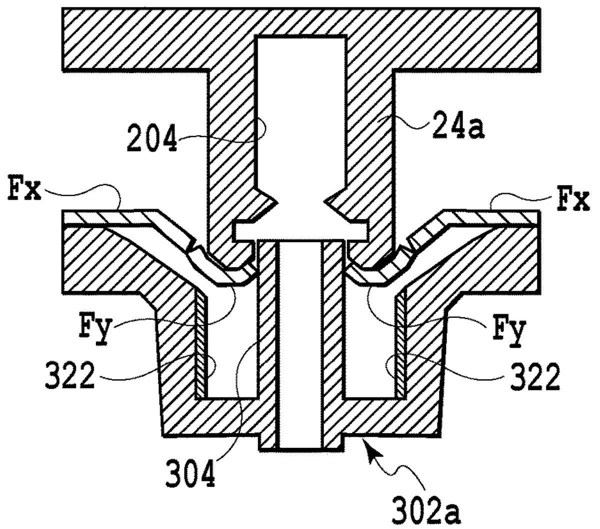
Figure 9C:
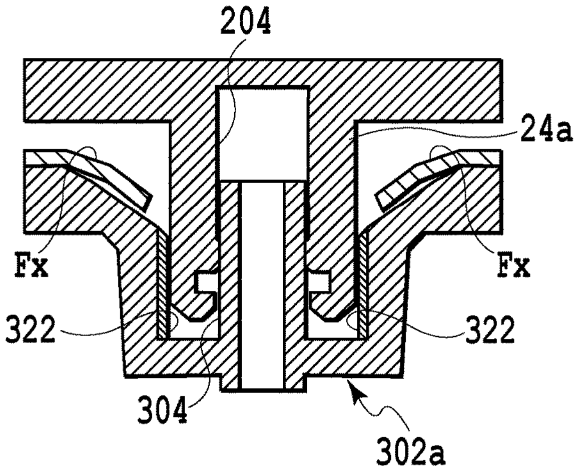

FIGS. 8A and 8B are diagrams for explaining the shape of the notch portion 312*b*: FIG. 8A shows the notch portion 312*b* before a break, and FIG. 8B shows the notch portion 312*b* after the break. FIGS. 9A to 9C are diagrams showing the relationship between a fragment of the seal member 308 and the restriction portion 322 in a case where the seal member 308 is broken at the notch portion 312*b*. Incidentally, FIGS. 9A to 9C are diagrams corresponding to cut cross-sections cut at a notch portion passing over the restriction portion 322.

The notch portion 312*b* includes a notch 702 passing over the liquid supply port 304 and the restriction portion 322, and a notch 704 for dividing a seal member generated at the time of a break into pieces near the restriction portion (see FIG. 8A). The notch portion 312*b* also includes a notch 706 that passes over the liquid supply port 304 and intersects the notch 702. In the present embodiment, the notch 702 extends in the X direction and the notch 706 extends in the Y direction. Further, the notch 704 includes, on both end sides in the Y direction, a first region extending obliquely in the X direction and the Y direction toward the center of the fitting portion 302*a* and a second region extending in the Y direction between the first regions. As a result, in a case where the connection portion 24*a* is fitted into the fitting portion 302*a*, the seal member 308 in a position corresponding to the fitting portion 302*a* is broken at each notch in the notch portion 312*b*. Due to this break, the seal member 308 at the notch portion 312*b* is divided into a fragment Fy pushed in the Y direction and a fragment Fx pushed in the X direction (see FIG. 8B).

In a case where the seal member 308 is broken at the notch portion 312*b* (see FIGS. 9A and 9B) in a case where the positioned connection portion 24*a* is fitted into the fitting portion 302*a*, the notch 702 and the notch 706 are broken, and the liquid supply port 304 is exposed from the broken portion. Thereafter, by further lowering the connection portion 24*a*, the connection portion 24*a* is fitted into the fitting portion 302*a* while the liquid supply port 304 is inserted into the flow path 204. At this time, the notch 704 is broken, the breakage of the notch 702 expands, and the restriction portion 322 is exposed from the broken portion of the notch 702 as viewed from directly above. Further, the fragments Fx and Fy are formed by breaking the notch 702, 704, and 706.

After that, the connection portion 24*a* is further lowered and fitted into the fitting portion 302*a* (see FIG. 9C). At this time, the fragment Fy is pushed away in the Y direction and accommodated in the depressed portion 301*a* of the fitting portion 302*a*. Further, although the fragment Fx is pushed away in the X direction, the inclined portion 320 is located below the fragment Fx, so that the fragment Fx is located on the inclined portion 320. It should be noted that a distance L1 from the second region of the notch 704 to an end of the notch 706, which determines the length of the fragment Fx in the X direction, is shorter than the length l1 of the inclined portion 320. Thus, the fragment Fx does not overlap the restriction portion 322.

Here, a distance L3 from the center O of the liquid supply port 304 (fitting portion 302*a*) to the second region of the notch 704 is made longer than a distance L0 from the center O to the restriction portion 322 (see FIG. 9A). However, in a case where the distance L3 is too long (the distance L1 is too short), there is a possibility that the fragment Fy pushed in the Y direction in the depressed portion 301*a* may overlap the restriction portion 322. Thus, for example, the distance L1 is configured to satisfy $(l\tfrac{1}{2})<L1<l1$. Further, in order to suppress overlapping of the fragment Fy with the restriction portion 322, for example, the length l2 of the second region of the notch 704 is designed to be larger than the length W of the restriction portion 322 in the Y direction. Designing the notch portion 312*b* in this way reduces entrainment of the fragments Fx and Fy generated by the notch portion 312*b* of the seal member 308 in between the restriction portion 322 and the connection portion 24*a* in a case where the connection portion 24*a* is fitted into the fitting portion 302*a*.

As described above, in order to position the connection portion 24*a* of the joint 24, in the present embodiment, a positioning portion 306 that positions the joint 24 at one point is formed in the liquid storage container 28. Further, in the liquid storage container 28, the guide portion 310 is formed in one of the fitting portions 302 into which the connection portion 24*a* is fitted. The guide portion 310 has an elliptical shape extending in a direction (approximately the X direction) in which the joint 24 can rotate by being fitted into the positioning portion 306, and includes an inclined portion 320 inclined downward toward the liquid supply port 304 in the fitting portion 302. The guide portion 310 also includes the restriction portion 322 that abuts the outer peripheral surface of the connection portion 24*a* to restrict the movement of the connection portion 24*a* (the rotation of the joint 24) in a case where the fitting portion 302 and the connection portion 24*a* are fitted to each other.

As a result, even in a case where the joint 24 positioned by the positioning portion 306 rotates around the positioning portion 306 and deviates from its proper position, the inclined portion 320 guides the joint 24 to a position where the joint 24 can be fitted as the joint 24 descends. After that, in a case where the connection portion 24*a* is fitted into the fitting portion 302 so that the liquid supply port 304 is inserted into the flow path 204, the restriction portion 322 abuts the outer peripheral surface of the connection portion 24*a* to restrict the movement of the connection portion 24*a*, that is, the rotation of the joint 24. Thus, as compared to the known technique in which a plurality of positioning portions are provided, in the present embodiment, a region required for the configuration for positioning the joint 24 in the liquid storage container is made smaller, which can contribute to the downsizing of the liquid storage container.

Second Embodiment

Figure 10A:
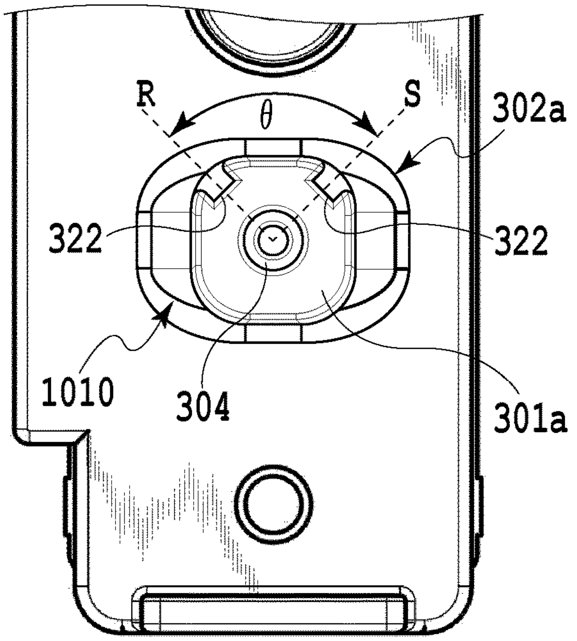
FIGS. 10A to 10D are diagrams showing a guide portion of the other embodiments.

Next, a liquid storage container according to a second embodiment will be described with reference to FIG. 10A. FIG. 10A is a diagram showing a guide portion 1010 in the liquid storage container according to the second embodiment. In the following description, a constituent identical or corresponding to that of the liquid storage container described in the above first embodiment is assigned the same reference numeral as that used in the first embodiment, and the detailed description thereof will be omitted.

In the first embodiment, in the depressed portion 301*a* of the fitting portion 302*a*, the restriction portions 322 are arranged in opposed positions with the liquid supply port 304 interposed therebetween. On the other hand, in the second embodiment, the restriction portions 322 are arranged in two positions such that an angle θ between a line segment R connecting one position and the center of the liquid supply port 304 and a line segment S connecting the other position and the center is 90 degrees or more and less than 180 degrees. In a case where the angle θ is less than 90 degrees, the effect of restricting the movement of the connection portion 24*a*, that is, the rotation of the joint 24, is reduced. Incidentally, it is most desirable that the restriction portion 322 be located on the movement trajectory of the connection portion 24*a* using the positioning portion 306 as a rotation axis.

Third Embodiment

Figure 10B:
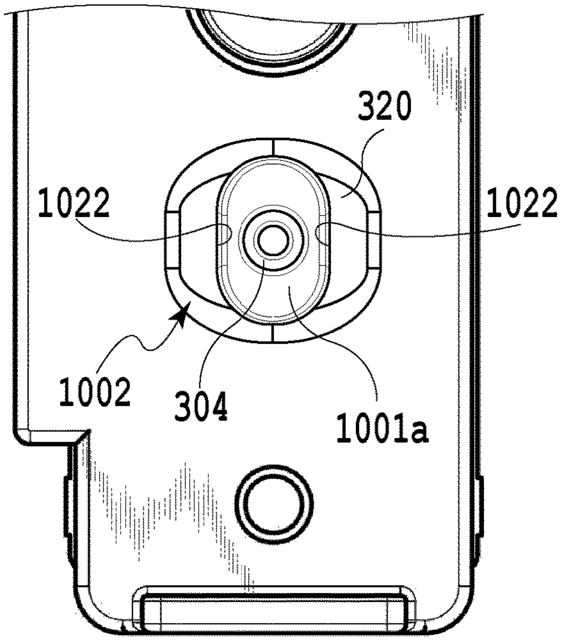

Next, a liquid storage container according to a third embodiment will be described with reference to FIG. 10B. FIG. 10B is a diagram showing a fitting portion 1002*a* in the liquid storage container according to the third embodiment. In the following description, a constituent identical or corresponding to that of the liquid storage container described in the above first embodiment is assigned the same reference numeral as that used in the first embodiment, and the detailed description thereof will be omitted.

In the first embodiment, the movement of the connection portion 24*a* is restricted by the two restriction portions 322 provided in the depressed portion 301*a* of the fitting portion 302*a*. On the other hand, in the third embodiment, opposed flat surfaces 1022 forming a depressed portion 1001*a* of the fitting portion 1002*a* abut the outer peripheral surface of the connection portion 24*a* to be fitted. Specifically, for example, the depressed portion 1001*a* of the fitting portion 1102*a* has a shape including two curved surfaces facing each other in the longitudinal direction and the two flat surfaces 1022 facing each other in the transverse direction. Further, the flat surfaces 1022 abut the outer peripheral surface of the connection portion 24*a* to be fitted. That is, in the present embodiment, the connection portion 24*a* is sandwiched between the flat surfaces 1022, thereby restricting the movement of the connection portion 24*a*. That is, in the present embodiment, each flat surface 1022 has a function corresponding to that of the restriction portion 322, and the flat surfaces 1022 and the inclined portion 320 form the guide portion 310.

The shape of the depressed portion 1001*a* as viewed from directly above is not limited to a substantially elliptical shape extending in the Y direction as shown in FIG. 10B. For example, the depressed portion 1001*a* may have a symmetrical shape such as a substantially circular shape or a substantially square shape, or may have a substantially trapezoidal shape that is not symmetrical. In the present embodiment, the flat surface of the depressed portion 1001*a* functions as a member for restricting the movement of the connection portion 24*a*. Thus, space for installing the fitting portion 1002*a* can be reduced as compared to the mode in which the movement is restricted by a rib-shaped member as in the first and second embodiments, which can contribute to the downsizing of the liquid storage container.

Fourth Embodiment

Figure 10C:
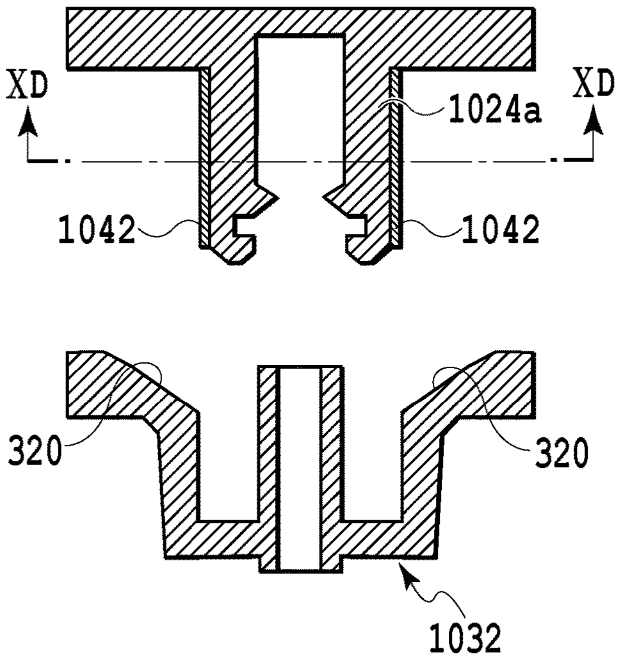
Figure 10D:
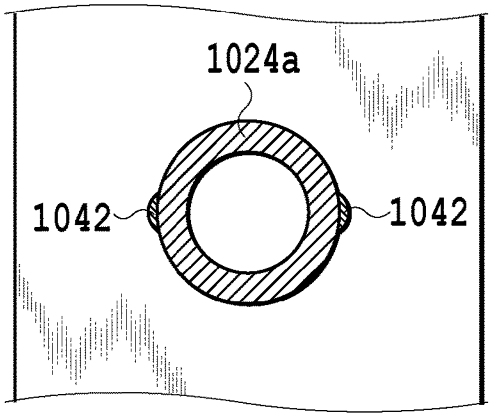

Next, a liquid storage container according to a fourth embodiment will be described with reference to FIGS. 10C and 10D. FIG. 10C is a diagram showing a fitting portion 1032 in the liquid storage container according to the fourth embodiment and a connection portion 1024*a* of the joint 24 fitted into the fitting portion 1032. FIG. 10D is a cross-sectional view taken along line XD-XD in FIG. 10C. In the following description, a constituent identical or corresponding to that of the liquid storage container described in the above first embodiment is assigned the same reference numeral as that used in the first embodiment, and the detailed description thereof will be omitted.

In the first embodiment, the movement of the connection portion 24*a* to be fitted is restricted by providing the restriction portion 322 in the depressed portion 301*a*. On the other hand, in the fourth embodiment, on the outer peripheral surface of the connection portion 1024*a* corresponding to the fitting portion 1032, two protrusions 1042 are formed so as to abut the depressed portion 301*a* in a case where the connection portion 1024*a* is fitted into the fitting portion 1032. In the present embodiment, the two protrusions 1042 are provided in positions facing each other so as to sandwich the center of the connection portion 1024*a*. In the present embodiment, the surface of the depressed portion 301*a* abutting the protrusions 1042 and the inclined portion 320 form the guide portion 310.

In the present embodiment, the protrusion 1042 is not provided on the side of the liquid storage container to be replaced, but is provided on the side of the joint used repeatedly. Thus, there is a possibility that each protrusion 1042 will be worn out by replacing the liquid storage container. Accordingly, it is preferable that the protrusion 1042 be made of, for example, a material with high wear resistance or that the surface of the protrusion 1042 be subjected to processing to reduce frictional resistance.

OTHER EMBODIMENTS

It should be noted that the above embodiments may be modified as shown in (1) to (5) below.

(1) In the above embodiments, the positioning portion 306 is arranged between the second fitting portion 302*b* and the third fitting portion 302*c* from one side in the Y direction among the three fitting portions 302, but the present invention is not limited to this. The positioning portion 306 may be arranged between the first fitting portion 302*a* and the fitting portion 302*b* or may be arranged on one side or the other side in the Y direction of the three fitting portions 302.

(2) In the above embodiments, the guide portion 310 is provided in the fitting portion 302*a* provided on one side in the Y direction, but the present invention is not limited to this. The guide portion 310 may further be provided in the fitting portion 302*b* or the fitting portion 302*c*, or may be provided in the fitting portion 302*b* and the fitting portion 302*c*. Alternatively, at least one of the fitting portion 302*b* and the fitting portion 302*c* may be provided only with the restriction portion 322. Incidentally, in a case where there are four or more fitting portions 302 provided in the lid member 32, the guide portion 310 may be formed in two or more of the fitting portions 302. However, in this case, it is preferable that the guide portion 310 be provided at least in the two fitting portions 302 located in positions most distant from each other. Further, in the above embodiments, the two restriction portions 322 (the flat surface 1022 and the protrusion 1042) are provided for restricting the movement of the connection portion 24*a* (1024*a*) (the rotation of the joint 24), but the present invention is not limited to this. Three or more such restriction portions may be provided.

(3) In the above embodiments, the guide portion 310 is configured to cooperate with the positioning portion 306 to position the connection portion 24*a* and fitting portion 302 corresponding to each other in positions such that the two can be fitted. Thus, although not specifically described in the above embodiments, the guide portion 310 is formed in the fitting portion 302 located in a position where the connection portion 24*a* first abuts by the joint 24 being lowered by operating the joint lever 25 among the plurality of fitting portions 302. Alternatively, the connection portion 24*a* corresponding to the fitting portion 302 provided with the guide portion 310 is formed to contact the guide portion 310 prior to contact of another connection portion 24*a* with the fitting portion.

(4) Although not specifically described in the above embodiments, the liquid ejection head 22 may be configured to store one type of liquid in the liquid storage container 28 and eject the one type of liquid, or may be configured to store multiple types of liquids in the liquid storage container 28 and eject the multiple types of liquids. In the case of storing multiple types of liquid, the liquid storage container 28 is provided with a storage portion capable of storing each type of liquid so as to correspond to one of the liquid supply ports 304. Further, in the above embodiments, the liquid storage container 28 is formed by welding the lid member 32 to the case member 30, but the present invention is not limited to this. A configuration in the case member 30 and a configuration in the lid member 32 may be formed by one member.

(5) The above embodiments and the various modes shown in (1) and (4) above may be combined as appropriate.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-035505, filed Mar. 8, 2023, which is hereby incorporated by reference wherein in its entirety.

What is claimed is:

1. A liquid storage container capable of storing liquid inside the liquid storage container comprising:

a fitting portion comprising a communication port that establishes communication between an inside and an outside, wherein a supply member for supplying liquid is fitted and can supply the inside with liquid via the communication port;

a first positioning portion configured to position the supply member at one point; and a second positioning portion comprising a guide provided in the fitting portion and capable of guiding the supply member to a position where the supply member is fitted into the fitting portion in a case where the supply member is fitted into the fitting portion while being positioned by the first positioning portion and a restriction portion configured to restrict movement of the supply member using the first positioning portion as a rotation axis in the position where the supply member is fitted into the fitting portion.

2. The liquid storage container according to claim 1, wherein the guide is an inclined portion formed around the fitting portion and capable of guiding the supply member to the position where the supply member is fitted into the fitting portion in accordance with movement of the supply member in a case of being fitted into the fitting portion.

3. The liquid storage container according to claim 1, wherein the guide extends in a movement direction in which the supply member moves using the first positioning portion as a rotation axis.

4. The liquid storage container according to claim 1, wherein the restriction portions are provided in two opposed positions with the communication port interposed therebetween.

5. The liquid storage container according to claim 1, wherein the restriction portions are provided in two positions such that an angle between a line segment connecting a first one of the two positions and a center of the communication port and a line segment connecting a second one of the two positions and the center of the communication port is 90 degrees or more and less than 180 degrees.

6. The liquid storage container according to claim 5, wherein the restriction portion is located on a movement trajectory of the supply member using the first positioning portion as a rotation axis.

7. The liquid storage container according to claim 1, wherein the fitting portion comprises a depression into which the supply member is inserted in a case where the supply member is fitted, and the restriction portion is formed in the depression.

8. The liquid storage container according to claim 7, wherein the restriction portion is formed to protrude toward the communication port in the depression.

9. The liquid storage container according to claim 7, wherein the restriction portion is formed by opposed flat surfaces forming the depression.

10. The liquid storage container according to claim 1, wherein the communication port is provided in the depression into which the supply member is inserted in a case where the supply member is fitted, and the restriction portion is formed on an outer peripheral surface of the communication port.

11. The liquid storage container according to claim 1, wherein the restriction portion abuts a protrusion formed on an outer peripheral surface of the supply member.

12. The liquid storage container according to claim 7, wherein a plurality of the fitting portions are provided, and the depression in the fitting portion provided with the second positioning portion is formed to be larger than the depression in the fitting portion which is not provided with the second positioning portion.

13. The liquid storage container according to claim 1, wherein a plurality of the fitting portions are provided, and center positions of a plurality of the fitting portions and the first positioning portion are located on an identical straight line.

14. The liquid storage container according to claim 1, wherein a plurality of the fitting portions are provided, and the second positioning portion is provided at least in two of the fitting portions located most distant from each other.

15. The liquid storage container according to claim 1, wherein a plurality of the fitting portions are provided, and the second positioning portion is provided in the fitting portion that the supply member to be fitted contacts prior to the other fitting portion or portions.

16. The liquid storage container according to claim 15, wherein the fitting portion provided with the second positioning portion is located in a position where the fitting portion contacts the supply member prior to the other fitting portion or portions.

17. The liquid storage container according to claim 1, wherein a plurality of the fitting portions are provided, and the restriction portion is formed in at least one of the fitting portions which are not provided with the second positioning portion.

18. The liquid storage container according to claim 1, wherein the liquid storage container comprises:

a case member comprising an opening and capable of storing liquid inside the case member; and a lid member configured to cover the opening of the case member, wherein the fitting portion, the first positioning portion, and the second positioning portion are formed in the lid member.

19. The liquid storage container according to claim 1, further comprising:

a seal member attached to the liquid storage container so as to cover the fitting portion and comprising a notch portion provided with a notch that can be broken by a press in a position corresponding to the fitting portion, wherein the predetermined notch portion formed in the position corresponding to the fitting portion provided with the second positioning portion is provided with the notch so that a fragment generated by a break at the notch in a case where the supply member is fitted into the fitting portion does not overlap the restriction portion.

20. The liquid storage container according to claim 19, wherein the predetermined notch portion comprises:

a first notch passing over the communication port and the restriction portion;

a second notch passing over the communication port and intersecting the first notch; and a third notch that divides the fragment generated near the restriction portion into pieces.

* * * * *